US009651147B2

(12) United States Patent
Yoshimura et al.

(10) Patent No.: US 9,651,147 B2
(45) Date of Patent: May 16, 2017

(54) AUTOMATIC TRANSMISSION FAILURE DETERMINATION APPARATUS

(71) Applicant: HONDA MOTOR CO., LTD., Tokyo (JP)

(72) Inventors: Yusuke Yoshimura, Wako (JP); Takuya Kurokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 14/795,269

(22) Filed: Jul. 9, 2015

(65) Prior Publication Data

US 2016/0017986 A1    Jan. 21, 2016

(30) Foreign Application Priority Data

Jul. 16, 2014  (JP) .................................. 2014-146350

(51) Int. Cl.
*F16H 61/12* (2010.01)
*F16H 3/00* (2006.01)
*F16H 61/688* (2006.01)

(52) U.S. Cl.
CPC ............ *F16H 61/12* (2013.01); *F16H 3/006* (2013.01); *F16H 61/688* (2013.01); *F16H 2061/1232* (2013.01); *F16H 2061/1268* (2013.01); *F16H 2200/006* (2013.01)

(58) Field of Classification Search
None
See application file for complete search history.

(56) References Cited

U.S. PATENT DOCUMENTS

| 5,492,210 A | 2/1996 | Eaton |
| 2002/0151408 A1* | 10/2002 | Nishina ................... F16H 61/12 477/34 |
| 2011/0056317 A1 | 3/2011 | Sato |
| 2011/0303040 A1 | 12/2011 | Hagelskamp |
| 2012/0304816 A1 | 12/2012 | Yagi |

FOREIGN PATENT DOCUMENTS

JP    2013-189993 A    9/2013

OTHER PUBLICATIONS

U.S. Office Action U.S. Appl. No. 14/795,344 issued Feb. 11, 2016.

* cited by examiner

*Primary Examiner* — Ramya Burgess
*Assistant Examiner* — Timothy M Hannon
(74) *Attorney, Agent, or Firm* — Squire Patton Boggs (US) LLP

(57) ABSTRACT

In an apparatus for determining failure of a double-clutch automatic transmission having a line pressure-regulating valve, pressure-regulating valves and select valves, it is determined whether the pressure regulated by the line pressure-regulating valve is equal to or greater than a predetermined pressure and it is determined that the line pressure-regulating valve has failed if the pressure regulated by the line pressure-regulating valve is determined to be less than the predetermined pressure, whereas it is determined that one from among the pressure-regulating valves and select valves has failed if the pressure regulated by the line pressure-regulating valve is determined to be equal to or greater than the predetermined pressure.

6 Claims, 9 Drawing Sheets

FIG. 4

| MODE | | SHIFT VALVES (CLUTCHES) | | CLUTCHES | | | SHIFT VALVES (GEARS) | | | | GEAR ENGAGING MECHANISM | | | | | | | | NOTE |
|---|---|---|---|---|---|---|---|---|---|---|---|---|---|---|---|---|---|---|---|
| | | SHA | SHB | CL1 | CL2 | RVS | SHC | SHD | SHE | PS1 | PS3 | PS6 | PS8 | PS5 | PS7 | PS2 | PS4 | |
| A | 1 | × | × | A | B | × | × | × | × | × | C | × | × | D | × | × | × | ORDINARY CONDITION |
| | 2 | × | × | A | B | × | × | × | ○ | × | C | × | × | × | D | × | × | |
| | 3 | × | × | A | B | × | × | ○ | × | C | × | × | × | D | × | × | × | |
| | 4 | × | × | A | B | × | × | ○ | ○ | C | × | × | × | × | D | × | × | |
| | 5 | × | × | A | B | × | ○ | × | × | × | × | C | × | × | × | × | D | |
| | 6 | × | × | A | B | × | ○ | × | ○ | × | × | C | × | × | × | D | × | |
| | 7 | × | × | A | B | × | ○ | ○ | × | × | × | × | C | × | × | × | D | |
| | 8 | × | × | A | B | × | ○ | ○ | ○ | × | × | × | C | × | × | D | × | |
| B | 1 | × | ○ | A | × | × | × | × | × | × | C | × | × | × | × | × | × | LSD FAILED CONDITION (LSD OUTPUT PRESSURE IS SHUT OFF BY ENERGIZING SHB) |
| | 2 | × | ○ | A | × | B | × | × | ○ | × | C | × | × | × | × | × | × | |
| | 3 | × | ○ | A | × | × | × | ○ | × | C | × | × | × | × | × | × | × | |
| | 4 | × | ○ | A | × | B | × | ○ | ○ | C | × | × | × | × | × | × | × | |
| | 5 | × | ○ | A | × | × | ○ | × | × | × | × | C | B | × | × | × | × | |
| | 6 | × | ○ | A | × | × | ○ | × | ○ | × | × | C | C | × | × | × | × | |
| | 7 | × | ○ | A | × | × | ○ | ○ | × | × | × | B | C | × | × | × | × | |
| | 8 | × | ○ | A | × | × | ○ | ○ | ○ | × | × | × | C | × | × | × | × | |
| C | 1 | ○ | × | × | B | × | × | × | × | × | × | × | × | D | × | × | × | LSC FAILED CONDITION (LSC OUTPUT PRESSURE IS SHUT OFF BY ENERGIZING SHA) |
| | 2 | ○ | × | × | B | × | × | × | ○ | × | × | × | × | D | A | × | × | |
| | 3 | ○ | × | × | B | × | × | ○ | × | × | × | × | × | A | D | × | × | |
| | 4 | ○ | × | × | B | × | × | ○ | ○ | × | × | × | × | A | × | × | D | |
| | 5 | ○ | × | × | B | × | ○ | × | × | × | × | × | × | × | × | × | × | |
| | 6 | ○ | × | × | B | × | ○ | × | ○ | × | × | × | × | A | × | D | × | |
| | 7 | ○ | × | × | B | × | ○ | ○ | × | × | × | × | × | × | A | × | D | |
| | 8 | ○ | × | × | B | × | ○ | ○ | ○ | × | × | × | × | A | × | D | × | |

FIG.6

| CONCEIVABLE FAILURE SITE | KIND OF FAILURE |
|---|---|
| (1) SHIFT VALVE SHA (SHB) | ON-FAILURE |
| (2) SHIFT VALVE SHC | ON-FAILURE |
| (3) SHIFT VALVE SHD (SHE) | OFF-FAILURE |
| (4) LINEAR SOLENOID VALVE LSC (LSD) | OFF-FAILURE |
| (5) LINEAR SOLENOID VALVE LSF | ON-FAILURE |
| (6) STROKE SENSOR | CHARACTERISTIC ABNORMAL |

FIG. 7

| SEQUENTIAL NO | SEQ1 | | | | SEQ2 | | SEQ3 | | |
|---|---|---|---|---|---|---|---|---|---|
| MODE | SENSOR CHECKING | | | | CLUTCH CHECKING | | CLUTCH CHECKING | | |
| OPERATION | N → IN GEAR AT 1ST | | | | TURN ALL CLUTCHES OFF | | TURN ODD CLUTCH ON | | |
| KIND OF FAILURE | DETERMINATION POSSIBLE | | | DIFFERENCE LARGE | OTHER THAN LOW PRESSURE | LOW PRESSURE | CLUTCH P PRESSURE NOT SUPPLIED (LOW PRESSURE) | CLUTCH PRESSURE LOW (LOW LINE PRESSURE) | NORMAL PRESSURE |
| | DIFFERENCE NIL | DIFFERENCE GOOD | DIFFERENCE NOT GOOD | | | | | | |
| PISTON ROD | N | | | | | | | | |
| FAILURE SITE / KIND OF FAILURE | (6) ABNORMAL | (6) NORMAL | (6) CHARACTERISTIC ABNORMAL | (6) EXCLUDED | EXCEPTION | NO DETERMINATION | (1) ABNORMAL | (5) ABNORMAL | (1)(5) NORMAL |
| | | | | | | | (1) ON-FAILURE (CLUTCH PRESSURE / ENGAGING PRESSURE DRAINED) | (5) HIGH PRESSURE FAILURE / LOW LINE PRESSURE FAILURE | (1)(5) EXCLUDED |
| INDICATION IN FLOW-CHART | FAILURE f | | | | FAILURE b | | FAILURE a | | FAILURE c-e |

| SEQ4 | | | SEQ5 | | | |
|---|---|---|---|---|---|---|
| GEAR ENGAGE CHECKING | | | GEAR ENGAGE CHECKING | | | |
| PRESHIFT TO EVEN GEAR | | | IN GEAR AT 8TH (VIA SAME PATH OF LINEAR SOLENOID VALVES) | | | |
| | IMMOVABLE | MOVABLE | | 8TH NOT ENGAGED (IMMOVABLE) | 6TH ENGAGED (MOVEBACK-WARD) | 8TH ENGAGED (NORMAL) |
| EXCEPTION | - | (2)(3)(6) NORMAL | | (2)(3)(6) NORMAL | (3) ABNORMAL | (1)(3)(4) NORMAL |
| NO DETERMINATION | (5) LOW PRESSURE FAILURE (INCLUDING OFF-FAILURE) | | | (5) LOW PRESSURE FAILURE (INCLUDING OFF-FAILURE) | (3) OFF-FAILURE | (2) ON-FAILURE |
| | FAILURE e | | | FAILURE e | FAILURE d | FAILURE c |

FIG.9

| MALFUNCTIONED GEARS (PISTON CHAMBERS) | USED LS | SHIFT VALVES TO BE USED | SHC | SHD | SHE | CLUTCH OPERATION | PRESSURE | IDENTIFICATION | GEAR FOR IDENTIFICATION | USED LS | SHC | SHD | SHE |
|---|---|---|---|---|---|---|---|---|---|---|---|---|---|
| 1 | C | ODD CLUTCH SHIFT VALVE | × | O | — | ↑ | LSA | ↑ | 8 | C | O | O | — |
| 2 | D | EVEN CLUTCH SHIFT VALVE | O | — | O | ↑ | LSB | ↑ | 7 | D | × | — | O |
| 3 | C | ODD CLUTCH SHIFT VALVE | × | × | — | ↑ | LSA | ↑ | 6 | C | O | × | — |
| 4 | D | EVEN CLUTCH SHIFT VALVE | O | — | × | ↑ | LSB | ↑ | 5 | D | × | — | × |
| 5 | D | EVEN CLUTCH SHIFT VALVE | × | — | × | ↑ | LSB | ↑ | 4 | D | O | — | × |
| 6 | C | ODD CLUTCH SHIFT VALVE | O | × | — | ↑ | LSA | ↑ | 3 | C | × | × | — |
| 7 | D | EVEN CLUTCH SHIFT VALVE | × | — | O | ↑ | LSB | ↑ | 2 | D | O | — | O |
| 8 | C | ODD CLUTCH SHIFT VALVE | O | O | — | ↑ | LSA | ↑ | 1 | C | × | O | — |

O: OPERATIVE (ENERGIZED)  ×: INOPERATIVE (DE-ENERGIZED)  "—": NOT INVOLVED

AUTOMATIC TRANSMISSION FAILURE DETERMINATION APPARATUS

CROSS-REFERENCE TO RELATED APPLICATION

This application is based upon and claims the benefit of priority from Japanese Patent Application No. 2014-146350 filed on Jul. 16, 2014, the contents of which are incorporated herein by reference.

BACKGROUND OF THE INVENTION

Field of the Invention

This invention relates to an automatic transmission failure determination apparatus, specifically to an apparatus for diagnosing failure of an electromagnetic valve (solenoid valve) of a hydraulic pressure supply circuit or the like in a double-clutch (twin-clutch) automatic transmission.

Description of Related Art

As an example of a double-clutch automatic transmission can be cited the one described in Patent Document 1 (Japanese Laid-Open Patent Application No. 2013-189993). The double-clutch automatic transmission set out in Patent Document 1 comprises input shafts connected through clutches to an engine or other power source mounted on a vehicle, an output shaft installed parallel to the input shafts, and a plurality of gear engaging mechanisms capable of establishing one among first to eighth speed gears by engaging one of the gears interposed between the input shaft and output shaft with the input shaft and the output shaft, and is equipped with a hydraulic pressure supply circuit having a line pressure-regulating valve for pressure-regulating hydraulic pressure discharged from an oil pump to line pressure, a plurality of pressure-regulating valves installed downstream of the line pressure-regulating valve, and a plurality of select valves for selectively supplying pressure-regulated hydraulic pressure to the gear engaging mechanisms, wherein the valves comprise electromagnetic valves.

SUMMARY OF THE INVENTION

When operation of a gear engaging mechanism fails in a double-clutch automatic transmission of this type, the large number of electromagnetic valves increases the number of conceivable failure sites and makes it impossible to identify the actual source from among the various possibilities. This has sometimes made it difficult to promptly implement remedial action.

The object of this invention is therefore to overcome the aforesaid problem by providing an automatic transmission failure determination apparatus that can promptly and efficiency identify the source the failure when operation of a gear engaging mechanism fails.

In order to achieve the object, this invention provides an apparatus for determining failure of an automatic transmission, comprising: input shafts that input rotation of a prime mover mounted on a vehicle through a pair of clutches; an output shaft arranged in parallel to the input shafts; gear engaging mechanisms that engage one of gears to the input shafts and the output shaft to establish one of speeds corresponding to the engaged one of the gears; a line pressure-regulating valve that pressure-regulates hydraulic pressure discharged from an oil pump to line pressure; pressure-regulating valves that pressure-regulate the line pressure regulated by the line pressure-regulating valve; select valves that selectively supply pressure regulated by the pressure regulating valves to one of the clutches and one of the gear engaging mechanisms; an operating state detector that detects operating state of the gear engaging mechanisms; a pressure detector that detect the pressure regulated by the line pressure-regulating valve and the pressure-regulating valves; and a failure determiner that determines whether the pressure regulated by the line pressure-regulating valve is equal to or greater than a predetermined pressure based on an output of the pressure detector when one of the gear engaging mechanisms is supplied with the pressure so as to establish a speed, but is detected to be inoperative by the operating state detector, and determines that the line pressure-regulating valve has failed, if the pressure regulated by the line pressure-regulating valve is determined to be less than the predetermined pressure, whereas determines one from among the pressure-regulating valves and select valves has failed by supplying the pressure to other of the gear engaging mechanisms and by detecting the operating state of the other gear engaging mechanism, if the pressure regulated by the line pressure-regulating valve is determined to be equal to or greater than the predetermined pressure.

BRIEF DESCRIPTION OF THE DRAWINGS

The above and other objects and advantages will be more apparent from the following description and drawings, in which:

FIG. 4 is an explanatory diagram showing an operating mode of the hydraulic pressure supply circuit shown in FIG. 2;

FIG. 6 is a diagram for explaining conceivable failure sites in the processing of the flowchart of FIG. 5;

FIG. 7 is a sequence diagram for explaining the processing of the flowchart of FIG. 5;

FIG. 9 is an explanatory diagram for explaining a speed gear to be operated for identifying the failure site, when the speed gear of the mechanism concerned is inoperative.

DETAILED DESCRIPTION OF THE INVENTION

An automatic transmission failure determination apparatus according to this invention is explained with reference to the attached drawings in the following.

Figure 1:
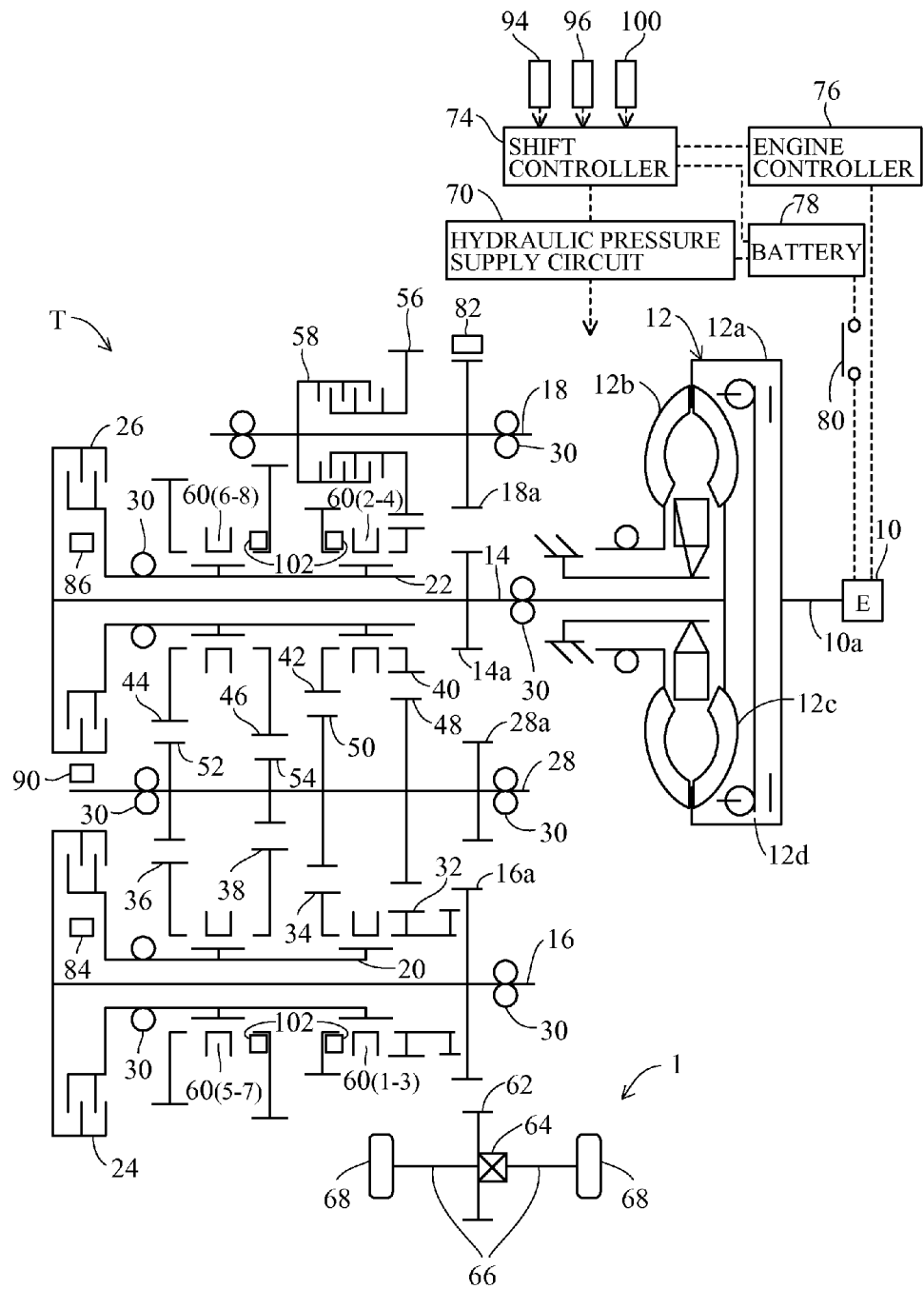
FIG. 1 is an overall schematic view of an automatic transmission failure determination apparatus according to an embodiment of this invention.

FIG. 1 is an overall schematic view of an automatic transmission failure determination apparatus according to an embodiment of this invention.

Now to explain, reference numeral 1 designates a vehicle, and the vehicle 1 is equipped with an automatic transmission (sometimes called "transmission" hereinafter) T. The transmission T is a double-clutch (twin-clutch) transmission with 8 forward-speed gears and 1 reverse-speed gear and has P, R, N and D ranges, for example.

The transmission T is connected through a torque converter 12 to a driveshaft 10a connected to a crankshaft of an engine (prime mover) 10, and is equipped with an even-numbered speed (2, 4, 6 and 8 speed) input shaft (second input shaft) 14 and with an odd-numbered speed (1, 3, 5 and 7 speed) input shaft (first input shaft) 16 parallel to the even-numbered speed input shaft 14. The engine 10 comprises, for example, a gasoline-fueled, spark-ignition internal combustion engine.

The torque converter 12 has a pump impeller 12b fixed on a drive plate 12a directly connected to the driveshaft 10a of the engine 10, a turbine runner 12c fixed on the even-numbered speed input shaft 14, and a lock-up clutch 12d, whereby the driving force (rotation) of the engine 10 is inputted to the even-numbered speed input shaft 14 through the torque converter 12.

An idler shaft 18 is provided in parallel with the even-numbered speed input shaft 14 and odd-numbered speed input shaft 16. The even-numbered speed input shaft 14 is connected to the idler shaft 18 through gears 14a, 18a, and the odd-numbered speed input shaft 16 is connected to the idler shaft 18 through gears 16a, 18a, whereby the even-numbered speed input shaft 14, the odd-numbered speed input shaft 16, and idler shaft 18 rotate together with the rotation of the engine 10.

Further, a first auxiliary input shaft 20 and a second auxiliary input shaft 22 are concentrically installed on the peripheries of the odd-numbered speed input shaft 16 and the even-numbered speed input shaft 14 to be rotatable relative thereto.

The odd-numbered speed input shaft 16 and first auxiliary input shaft 20 are connected through a first clutch (CL1) 24 for odd-numbered speeds and input rotation of the engine 10 through the first clutch 24, while the even-numbered speed input shaft 14 and the second auxiliary input shaft 22 are connected through a second clutch (CL2) 26 for even-numbered speeds and input rotation of the engine 10 through the second clutch 26.

The first and second clutches 24 and 26 comprise both wet multi-plate clutches that operate when supplied with working oil pressure (hydraulic pressure). When the first and second clutches 24 and 26 are supplied with hydraulic pressure and engage (mesh), the first and second auxiliary input shafts 20 are transmitted to the odd-numbered speed and even-numbered speed shafts.

An output shaft 28 is installed between and in parallel with the even-numbered speed input shaft 14 and odd-numbered speed input shaft 16. The even-numbered speed input shaft 14, odd-numbered speed input shaft 16, idler shaft 18 and output shaft 28 are rotatably supported by bearings 30.

On the first auxiliary input shaft 20 on the odd-numbered speed side are fixed a first-speed drive gear 32, a third-speed drive gear 34, a fifth-speed drive gear 36 and a seventh-speed drive gear 38, and on the second auxiliary input shaft 22 on the even-numbered speed side are fixed a second-speed drive gear 40, a fourth-speed drive gear 42, a sixth-speed drive gear 44 and an eighth-speed drive gear 46.

On the output shaft 28 are fixed a first-second speed driven gear 48 that meshes with the first-speed drive gear 32 and second-speed drive gear 40, a third-fourth speed driven gear 50 that meshes with the third-speed drive gear 34 and fourth-speed drive gear 42, a fifth-sixth speed driven gear 52 that meshes with the fifth-speed drive gear 36 and sixth-speed drive gear 44, and a seventh-eighth speed driven gear 54 that meshes with the seventh-speed drive gear 38 and eighth-speed drive gear 46.

The idler shaft 18 rotatably supports an RVS (reverse) idler gear 56 that meshes with the first-second speed driven gear 48 fixed on the output shaft 28. The idler shaft 18 and the RVS idler gear 56 are connected through an RVS clutch 58. Like the first and second clutches 24 and 26, the RVS clutch 58 is also a wet multi-plate clutch that operates when supplied with hydraulic pressure.

On the odd-numbered speed input shaft 16 are provided a first-third speed gear engaging mechanism 60(1-3) that selectively engages (fixes) the first-speed drive gear 32 and the third-speed drive gear 34 with the first auxiliary input shaft 20, and a fifth-seventh speed gear engaging mechanism 60(5-7) that selectively engages (fixes) the fifth-speed drive gear 36 and the seventh-speed drive gear 38 with the first auxiliary input shaft 20.

On the even-numbered speed input shaft 14 are provided a second-fourth speed gear engaging mechanism 60(2-4) that selectively engages (fixes) the second-speed drive gear 40 and the fourth-speed drive gear 42 with the second auxiliary input shaft 22, and a sixth-eighth speed gear engaging mechanism 60(6-8) that selectively engages (fixes) the sixth-speed drive gear 44 and the eighth-speed drive gear 46 with the second auxiliary input shaft 22. The four gear engaging mechanisms are hereinafter designated collectively by reference symbol 60.

Although not shown in the drawings, two opposed piston chambers corresponding to associated speed gears are provided in each of the four gear engaging mechanisms 60 and linked by a common piston rod (piston) so as to establish a desired speed gear when supplied with hydraulic pressure to the piston chamber on the opposite side, e.g., the first-third speed gear engaging mechanism 60(1-3) is configured to establish third speed when supplied with hydraulic pressure to a third-speed piston chamber.

Although not shown, shift forks are connected to the piston rods. The shift fork is fixed on a fork shaft on which detents (not shown) are drilled at locations corresponding to a central neutral position and left and right in-gear (engaged or meshed) positions. With this, the shift fork can be retained by a detent so that supply of hydraulic pressure is made unnecessary when in the neutral and left/right in-gear positions.

The shift fork is connected to an annular sleeve, and a spline-fitted hub is provided on the inner peripheral side of the sleeve to be movable in the axial direction of the first and second auxiliary input shafts 20, 22. The configuration is such that when the hub moves axially away from the center neutral position, it meshes through a synchronizer ring or the like with dog teeth of the associated drive gear 32, 34, 36, 38, 40, 42, 44, 46 so as to engage the drive gear 32, for example, with the first and second auxiliary input shafts 20, 22.

When the first clutch 24 or the second clutch 26 is engaged (meshed), the driving force of the engine 10 is transmitted from the odd-numbered speed input shaft 16 to the first auxiliary input shaft 20 or from the even-numbered speed input shaft 14 to the second auxiliary input shaft 22 and further to the output shaft 28 through the aforesaid drive gears and driven gears.

During reverse operation, the driving force of the engine 10 is transmitted to the output shaft 28 through the even-numbered speed input shaft 14, gear 14a, gear 18a, idler shaft 18, RVS clutch 58, RVS idler gear 56, and first-second speed driven gear 48. The output shaft 28 is connected to a differential mechanism 64 through a gear 62, and the differential mechanism 64 is connected to wheels (drive wheels) 68 through drive shafts 66. The vehicle 1 is represented by wheels 68 among other components.

Thus, the automatic transmission T comprises a double-clutch automatic transmission having the input shafts 14, 16, 20, 22 that input rotation of the engine 10 through the first and second clutches 24, 26, the output shaft 28 arranged in parallel to the input shafts, and the gear engaging mechanisms 60 in m number that engage one of gears 32, . . . 54 to the input shafts and the output shaft to establish one of speeds corresponding to the engaged one of the gears from among $\underline{n}$ (n: 2m) number of speeds.

All of the gear engaging mechanisms 60 are operated when supplied with hydraulic pressure (producing shifting force). A hydraulic pressure supply circuit 70 is provided for supplying hydraulic pressure to the gear engaging mechanisms, first and second clutches 24 and 26, and RVS clutch 58.

Figure 2:
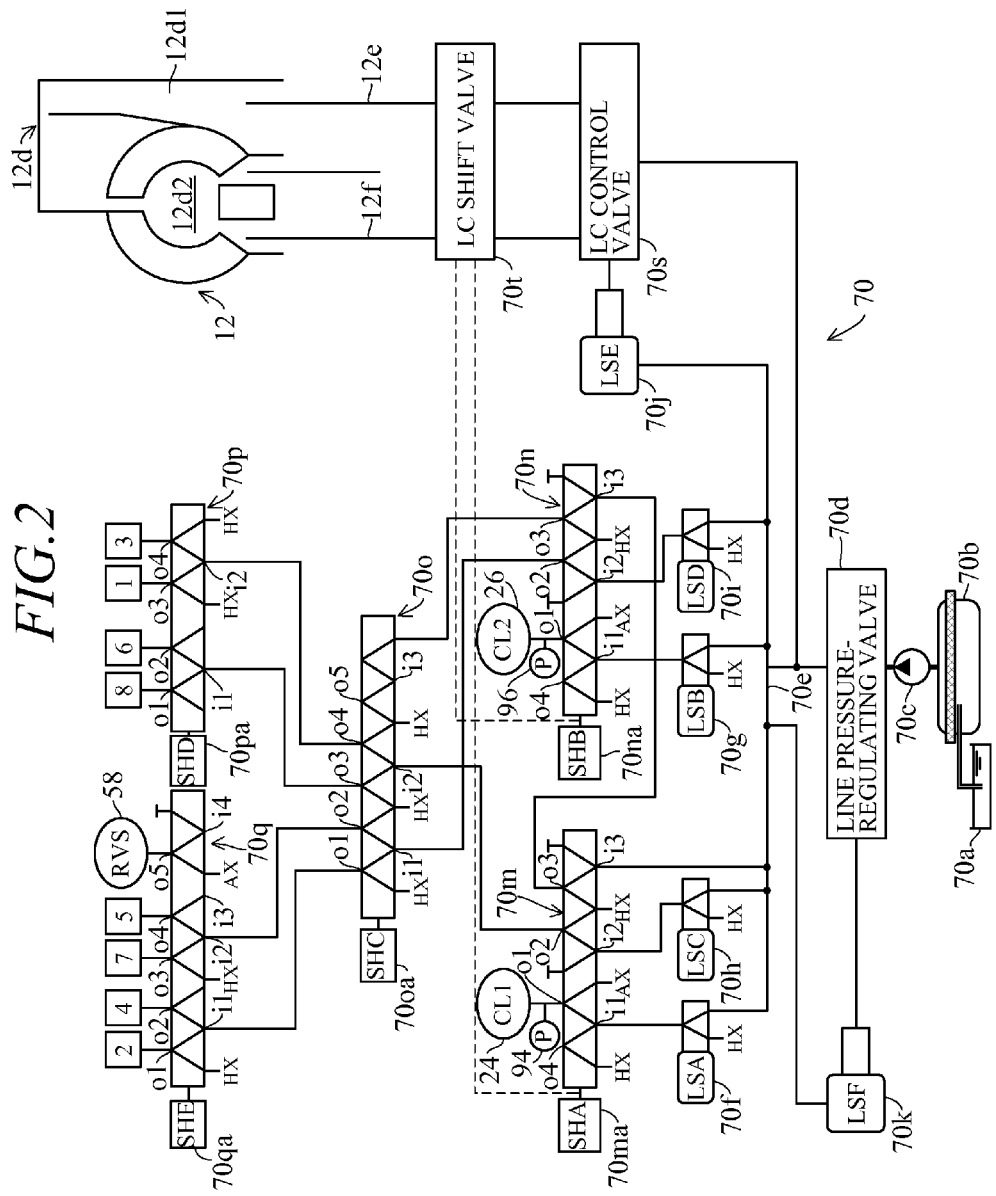
FIG. 2 is a circuit diagram illustrating the structure of a hydraulic pressure supply circuit shown in FIG. 1.
Figure 3:
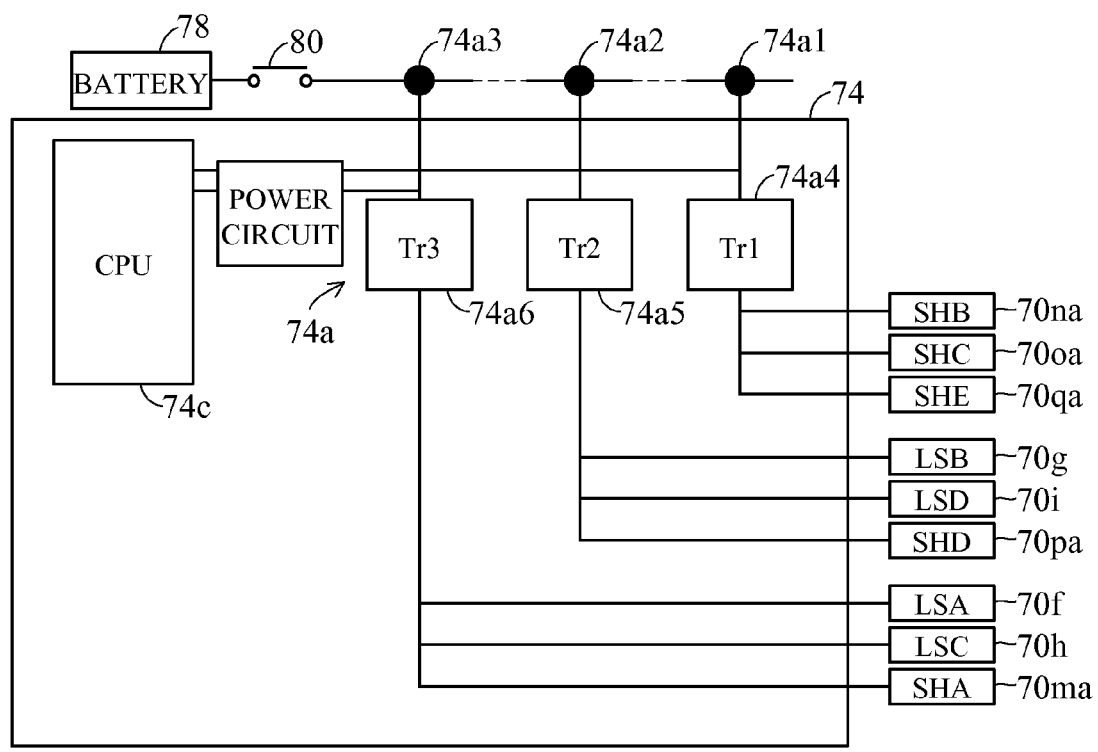
FIG. 3 is a block diagram showing the configuration of a shift controller shown in FIG. 1, with focus on a power source system.

FIG. 2 is a circuit diagram illustrating the structure of the hydraulic pressure supply circuit 70 in detail, FIG. 3 is a block diagram showing the configuration of a shift controller 74 of FIG. 1, with focus on an electric power source system, and FIG. 4 is an explanatory diagram showing an operating mode of the hydraulic pressure supply circuit 70 of FIG. 2.

Explanation will first be made with reference to FIG. 2. In the hydraulic pressure supply circuit 70, the discharge pressure (hydraulic pressure) of hydraulic oil ATF pumped from a reservoir (oil pan formed at the bottom of a transmission case) 70a through a strainer 70b by an oil pump (oil feed pump) 70c is pressure-regulated (depressurized) to line pressure by a line pressure-regulating valve (regulator valve) 70d.

Although not illustrated in the drawings, the oil pump 70c is connected to the pump impeller 12b of the torque converter 12 through a gear so as to be driven for operation by the engine 10.

The line pressure regulated by the line pressure-regulating valve 70d is sent through an oil passage (hydraulic passage) 70e to input ports of first to sixth linear solenoid valves (pressure-regulating valves), namely, a valve (LSA) 70f, a valve (LSB) 70g, a valve (LSC) 70h, a valve (LSD) 70i, a valve (LSE) 70j, and a valve (LSF) 70k.

The first to fifth linear solenoid valves 70f to 70j are pressure-regulating valves (electromagnetic pressure-regulating valves) configured as N/C (Normal/Closed) type to have a linear characteristic curve, so that when current flows through the solenoid, a spool is moved in proportion to the current flow to vary the hydraulic pressure inputted from the input port and outputted from its output port (output pressure) linearly, and so that the spool moves to an open position upon passage of current.

The characteristic of the sixth linear solenoid valve (LSF) 70k is defined as N/O (Normal/Open) that is differently from that of the first to fifth linear solenoid valves, namely, so that hydraulic pressure is maximum at de-energization and falls upon application current, whereafter the output hydraulic pressure decreases with increasing energization current.

Hydraulic pressure sent to the first linear solenoid valve (LSA) 70f is pressure-regulated to clutch pressure (pressure supplied to the first clutch for odd-numbered speeds (CL1) 24) and outputted from the output port thereof, while hydraulic pressure sent to the second linear solenoid valve (LSB) 70g is pressure-regulated to clutch pressure (pressure supplied to the second clutch for even-numbered speeds (CL2) 26) and outputted from the output port thereof.

Hydraulic pressure sent to the third linear solenoid valve (LSC) 70h is pressure-regulated to gear engagement pressure (pressure supplied to gear engaging mechanisms 60) and outputted from the output port thereof, while hydraulic pressure sent to the fourth linear solenoid valve (LSD) 70i is pressure-regulated to gear engagement pressure and outputted from the output port thereof.

Hydraulic pressure sent to the fifth linear solenoid valve (LSE) 70j is pressure-regulated to control (supply) pressure of the torque converter 12 and outputted from the output port thereof, while hydraulic pressure sent to the sixth linear solenoid valve (LSF) 70k is applied to the spool of the line pressure-regulating valve 70d as a signal pressure, whereby the line pressure output from the output port of the line pressure-regulating valve 70d is pressure-regulated to a line command pressure.

An odd-numbered speed clutch shift valve (select valve) 70m is installed downstream of the first and third linear solenoid valves (LSA) 70f and (LSC) 70h. The odd-numbered speed clutch shift valve 70m is provided with input ports i1, i2, i3 and output ports o1, o2, o3, o4. The input port i1 is connected to the output port of the first linear solenoid valve 70f, the input port i2 is connected to the output port of the third linear solenoid valve 70h, and the input port i3 is connected to the oil passage 70e.

An even-numbered speed clutch shift valve (select valve) 70n is installed downstream of the second and fourth linear solenoid valves (LSB) 70g and (LSD) 70i. The even-numbered speed clutch shift valve 70n is provided with input ports i1, i2, i3 and output ports o1, o2, o3, o4. The input port i1 is connected to the output port of the second linear solenoid valve 70g, the input port i2 is connected to the output port of the fourth linear solenoid valve 70i, and the input port i3 is connected to the output port o3 of the odd-numbered speed clutch shift valve 70m.

Three servo shift valves (select valves), specifically, a first servo shift valve 70o, a second servo shift valve 70p and a third servo shift valve 70q are installed downstream of the odd-numbered speed clutch shift valve 70m and even-numbered speed clutch shift valve 70n in hydraulic pressure supply.

The first servo shift valve 70o is provided with input ports i1, i2, i3 and output ports o1, o2, o3, o4, o5.

The second servo shift valve 70p is provided with input ports i1, i2 and output ports o1, o2, o3, o4, and the third servo shift valve 70q is provided with input ports i1, i2, i3, i4 and output ports o1, o2, o3, o4, o5.

In the odd-numbered speed clutch shift valve 70m, the output port of is connected to the first clutch 24 and the output port o2 to the input port i2 of the first servo shift valve 70o, and, as stated earlier, the output port o3 is connected to the input port i3 of the even-numbered speed clutch shift valve 70n.

In the even-numbered speed clutch shift valve 70n, the output port o1 is connected to the second clutch 26, the output port o2 to the input port i1 of the first servo shift valve 70o, and the output port o3 to the input port i3 of the first servo shift valve 70o.

In the first servo shift valve 70o, the output port o1 is connected to the input port i1 of the third servo shift valve 70q, the output port o2 to the input port i2 of the third servo shift valve 70q, the output port o3 to the input port i1 of the second servo shift valve 70p, and the output port o4 to the input port i2 of the second servo shift valve 70p.

In FIG. 2, the numerals 1 to 8 above the second and third servo shift valves 70p and 70q indicate piston chambers of the 8 speed gears of the gear engaging mechanisms 60. In the second servo shift valve 70p, the output port o1 is connected to the eighth-speed piston chamber of the sixth-eighth speed gear engaging mechanism 60(6-8), the output port o2 to the sixth-speed piston chamber thereof, the output port o3 to the first-speed piston chamber of the first-third speed gear engaging mechanism 60(1-3), and the output port o4 to the third-speed piston chamber thereof.

In the third servo shift valve 70q, the output port o1 is connected to the second-speed piston chamber of the second-fourth speed gear engaging mechanism 60(2-4), the output port o2 to the fourth-speed piston chamber thereof, the output port o3 to the seventh-speed piston chamber of the fifth-seventh speed gear engaging mechanism 60(5-7), and the output port o4 to the fifth-speed piston chamber thereof, and the output port o5 is connected to the RVS clutch 58.

The odd-numbered and even-numbered speed clutch shift valves 70m and 70n, and the first to third servo shift valves 70o, 70p and 70q are individually provided with shift valves. Namely, the odd-numbered speed clutch shift valve 70m is provided with a shift valve (SHA) 70ma and the even-numbered speed clutch shift valve 70n is provided with a shift valve (SHB) 70na, while the first to third servo shift valves 70o, 70p and 70q are provided with shift valves (SHC) 70oa, (SHD) 70pa and (SHE) 70qa, respectively.

The five shift valves (SHA) 70ma, (SHB) 70na, (SHC) 70oa, (SHD) 70pa and (SHE) 70qa are all on-off solenoid valves (hydraulic control valve (electromagnetic control valves)) configured to output a signal pressure when a plunger moves from off-position to on-position in response to passage of current through (energization of) the solenoid, thereby changing the position of the associated valve spool.

More concretely, in the odd-numbered and even-numbered speed clutch shift valves 70m and 70n, when the solenoids of the shift valves (SHA) 70ma and (SHB) 70na are energized, the input ports connect with the output ports on the left side of the drawing in response to movement of the spools by the signal pressures, while when they are de-energized, the input ports connect with different output ports on the right side. Owing to this configuration, the hydraulic pressure regulated by the first linear solenoid valve (LSA) 70f or the second linear solenoid valve (LSB) 70g is supplied to the first clutch 24 or the second clutch 26, and the hydraulic pressure regulated by the third linear solenoid valve (LSC) 70h or the fourth linear solenoid valve (LSD) 70i is supplied to the servo shift valve 70o.

Further, the configuration is such that, in the first to third servo shift valves 70o, 70p and 70q, when the solenoids of the associated shift valves (SHC) 70oa, (SHD) 70pa and (SHE) 70qa are energized, the input ports connect with predetermined output ports, specifically with output ports on the left side, while when they are de-energized, the input ports connect with output ports on a different side from the aforesaid predetermined ones, specifically with output ports on the right side.

When the solenoids of the shift valves (SHA) 70ma, (SHB) 70na are energized, the input ports are connected through a backup oil passage to one of the first to third servo shift valves 70o, 70p, 70q to supply hydraulic pressure regulated by the first linear solenoid valve (LSA) 70f or the second linear solenoid valve (LSB) 70g to the gear engaging mechanisms 60.

To explain in this regard, in the odd-numbered speed clutch shift valve 70m, when the solenoid of the shift valve (SHA) 70ma is energized, the output port o4 is connected to the input port i3 of the third servo shift valve 70q, and when the solenoid of its shift valve 70qa is energized, the input port i3 is connected to the output port o4, by which configuration the clutch hydraulic pressure regulated by the first linear solenoid valve (LSA) 70f is supplied in backup fashion to the fifth-speed piston chamber of the fifth-seventh speed gear engaging mechanism 60(5-7) to establish the fifth speed.

Similarly, in the even-numbered speed clutch shift valve 70n, when the solenoid of the shift valve (SHB) 70na is energized, the output port o4 is connected to the input port i3 of the first servo shift valve 70o, and when the solenoid of its shift valve (SHC) 70oa is energized, the input port i3 is connected to the output port o5. The output port o5 of the first servo shift valve 70o is connected to the input port i1 of the second servo shift valve 70p.

When the solenoid of the shift valve (SHD) 70pa of the second servo shift valve 70p is energized, the input port i1 is connected from the output port o1 to the eighth-speed piston chamber. On the other hand, when the solenoid of the shift valve (SHD) 70pa of the second servo shift valve 70p is de-energized, the input port i1 is connected from the output port o2 to the sixth-speed piston chamber, by which configuration the clutch hydraulic pressure regulated by the second linear solenoid valve (LSB) 70g is supplied in backup fashion to the sixth-speed and eighth-speed piston chamber of the sixth-eighth speed gear engaging mechanism 60(6-8) to establish the sixth speed and eighth speed. At this time, the shift valve 70 (SHE) qa of the third servo shift valve 70q is de-energized.

Further, regarding the control of the lock-up clutch (LC) 12d of the torque converter 12, an LC control valve 70s sends the line pressure of the oil passage 70e (more exactly, hydraulic pressure obtained by depressurizing the line pressure) to an LC shift valve 70t in accordance with control pressure regulated by the fifth linear solenoid valve (LSE) 70j.

The outputs (hydraulic pressures) of the shift valves (SHA) 70ma, (SHB) 70na disposed in the odd-numbered and even-numbered speed clutch shift valves 70m, 70n are applied to the spool of the LC shift valve 70t as signal pressure to control the supply and discharge of hydraulic pressure to the lock-up clutch (LC) 12d of the torque converter 12, by which configuration the lock-up clutch 12d is on-off controlled.

More specifically, when either or both of the shift valves (SHA) 70ma, (SHB) 70na are energized, the LC shift valve 70t is controlled to the LC-off position and line pressure is supplied from the LC control valve 70s through an oil passage 12e to a backpressure chamber 12d1 of the lock-up clutch 12d, thereby controlling the lock-up clutch 12d to the off (disengaged) position.

On the other hand, when the shift valves (SHA) 70ma, (SHB) 70na are both de-energized, the LC shift valve 70t is controlled to the LC-on position and line pressure is supplied from the LC control valve 70s through an oil passage 12f to an internal pressure chamber 12d2 of the lock-up clutch 12d, thereby turning on (engaging) the lock-up clutch 12d. At this time, the amount of engagement of the lock-up clutch 12d is regulated by the LC-off position of the LC shift valve 70t dictated by the control pressure.

Returning to the explanation of FIG. 1, the transmission T is equipped with a shift controller 74. The shift controller 74 comprises an electronic control unit (ECU) equipped with a CPU, ROM, RAM and the like. Further, an engine controller 76, similarly comprising an electronic control unit equipped with a microcomputer, is installed for controlling operation of the engine 10.

The shift controller 74 is configured to communicate with the engine controller 76 and acquires various information from the engine controller 76, including engine speed NE, throttle opening TH, and accelerator position AP.

FIG. 3 shows a current supply circuit 74a for supplying current to the solenoids of the four (first to fourth) linear solenoid valves (LSA) 70f, (LSB) 70g, (LSC) 70h and (LSD) 70i, and the solenoids of the five (first to fifth) shift valves (SHA) 70ma, (SHB) 70na, (SHC) 70oa, (SHD) 70pa and (SHE) 70qa. The current supply circuit 74a is disposed in the shift controller 74. The fifth and sixth linear solenoid valves (LSE) 70j, (LSF) 70k are not shown in FIG. 3.

As illustrated, the current supply circuit 74a comprises three terminals 74a1, 74a2 and 74a3, and cut-off transistors 74a4, 74a5 and 74a6, for connecting the solenoids of the first to fourth linear solenoid valves to a battery (power source) 78. In the drawing, CPU74c denotes a current control CPU, which is configured to energize/de-energize the solenoids when supplied and not supplied with current to the bases of the cut-off transistors.

As illustrated, a conventional ignition switch (IG) 80 is interposed between the battery 78 and the three terminals 74a1, 74a2, 74a3, by which configuration the engine 10 can be started and stopped in response to an operation of a driver.

Returning to the explanation of FIG. 1, in the case of the illustrated double-clutch transmission T, when the D range is selected by the driver, hydraulic pressure is supplied to the one of the gear engaging mechanisms 60 associated with the next speed gear to once pre-engage (mesh; preshift) one of the first and second auxiliary input shaft 20, 22, and then while hydraulic pressure is discharging from the one of the first and second clutches 24, 26 on the side associated with the current speed gear, hydraulic pressure is supplied to the other of the first and second clutches 24, 26 on the side associated with the one of the first auxiliary input shafts 20, 22 corresponding to the auxiliary input shaft associated with the next speed gear to shift speeds by engaging (meshing) with the even-numbered speed input shaft 14 or the odd-numbered speed input shaft 16.

Gear-shifting is fundamentally performed alternately between odd-numbered (1, 3, 5, 7) speed gears and even-numbered (2, 4, 6, 8) speed gears. As explained above, the piston rods of the gear engaging mechanisms 60 are connected through shift forks to fork shafts, detent mechanisms having concavo-convex surfaces are machined into the fork shafts, and when driven to one of the associated speed gears or the neutral position therebetween, the shift fork engages with an indentation in the detent mechanism so as to be retained in the driven position even if supply of hydraulic pressure is stopped.

When the driver selects the P or N range, supply of current to the linear solenoid valves (LSA) 70f, (LSB) 70g is stopped (turned off) and supply of current to the shift valves (SHA) 70ma, (SHB) 70na is started (turned on), thereby establishing the P or N range.

When the driver selects the R range, supply of current to the linear solenoid valve (LSA) 70f is stopped (turned off), supply of current to the (LSB) 70g is started (turned on), supply of current to the shift valve (SHA) 70ma is stopped, and supply of current to the shift valves (SHB) 70na and (SHE) 70qa is started, thereby connecting the output port o4 of the even-numbered speed clutch shift valve 70n through an unshown oil passage to the input port i4 and output port o5 of the third servo shift valve 70q, thus supplying hydraulic pressure via that route to engage the RVS clutch 58 and establish the R range.

FIG. 4 is an explanatory diagram showing operating modes of the hydraulic pressure supply circuit 70 shown in FIG. 2.

In FIG. 4, the symbols of the linear solenoid valves (LSA) 70f, (LSB) 70g, (LSC) 70h and (LSD) 70i are abbreviated to A, B, C and D, respectively. Energization and de-energization of the shift valves (SHA) 70ma to (SHE) 70qa are indicated by symbols ○ and x, respectively. The symbols A, B, C and D of the "clutches" and "gear engaging mechanism" PSn (PS: piston chamber; n: speed gear) indicate that hydraulic pressure regulated by linear solenoid valve (LSA) 70f, (LSA) 70g, (LSC) 70h, (LSD) 70i and so on is supplied, and x indicates that hydraulic pressure is not supplied.

Three operating modes A, B, C are established for the case where the linear solenoid valve (LSD) 70i and (LSC) 70h are in ordinary (normal) condition and the cases where they are in failed condition. Mode A is implemented when both are in ordinary (normal) condition, mode B when the (LSD) 70i is in failed condition, and mode C when the (LSC) 70h is in failed condition.

As illustrated, in mode B, since the linear solenoid valve (LSD) 70i has failed, its output hydraulic pressure is shut off by energizing the shift valve (SHB) 70na, and during this operation, the output hydraulic pressure of the linear solenoid valve (LSB) 70g for regulating clutch hydraulic pressure is also used in modes B5 and B7. In mode C, since the linear solenoid valve (LSC) 70h has failed, its output hydraulic pressure is shut off by energizing the shift valve (SHA) 70ma, and during this operation, the output hydraulic pressure of the linear solenoid valve (LSA) 70f for regulating clutch hydraulic pressure is also used in modes C2, C4, C6 and C8.

Engagement/disengagement and the like of the lock-up clutch 12d of the torque converter 12 is not indicated in FIG. 4.

Returning to the explanation of FIG. 1, first, second, third and fourth rotational speed sensors (operating state detector) 82, 84, 86 and 90 disposed near the idler shaft 18, first auxiliary input shaft 20, second auxiliary input shaft 22 and output shaft 28 of the transmission T respectively output a signal indicating input rotational speed NM to the transmission T from the idler shaft 18, signals indicating rotational speeds of the first and second auxiliary input shafts 20, 22, and a signal indicating rotational speed of the output shaft 28 (output rotational speed of the transmission T) NC (namely, vehicle speed V).

In the hydraulic pressure supply circuit 70 (FIG. 2), hydraulic pressure sensors 94 and 96 disposed on an oil passage connecting the output port o1 of the odd-numbered speed clutch shift valve 70m and the first clutch 24 and an oil passage connecting the output port o1 of the even-numbered speed clutch shift valve 70n and the second clutch 26 output signals indicating the pressures (hydraulic pressures) of hydraulic oil ATF supplied to the first and second clutches 24 and 26.

A range selector position sensor 100 disposed near a range selector (not shown) installed at a driver's seat of the vehicle 1 outputs a signal indicating a range to which the driver has operated the range selector (selected range) among, for example, ranges indicated on the range selector in the order of P, R, N and D from the top down as viewed by the driver.

A stroke sensor 102 installed near the sleeve of each gear engaging mechanisms 60 outputs a signal in accordance with the operating state of the piston rod that establishes the speed gear by displacement between the neutral and in-gear (engaged) positions of the sleeve.

The outputs of these sensors are all sent to the shift controller 74. Based on these sensor outputs, plus other data obtained through communication with the engine controller 76, the shift controller 74 energizes/de-energizes the linear solenoid valve (LSA) 70f and so on so as to control the operation of the first and second clutches 24, 26 and so on, and also the gear engaging mechanisms 60, and thereby control the operation of the transmission T.

The operation of the apparatus according to this embodiment, specifically the shift controller 74, will be explained next.

Figure 5:
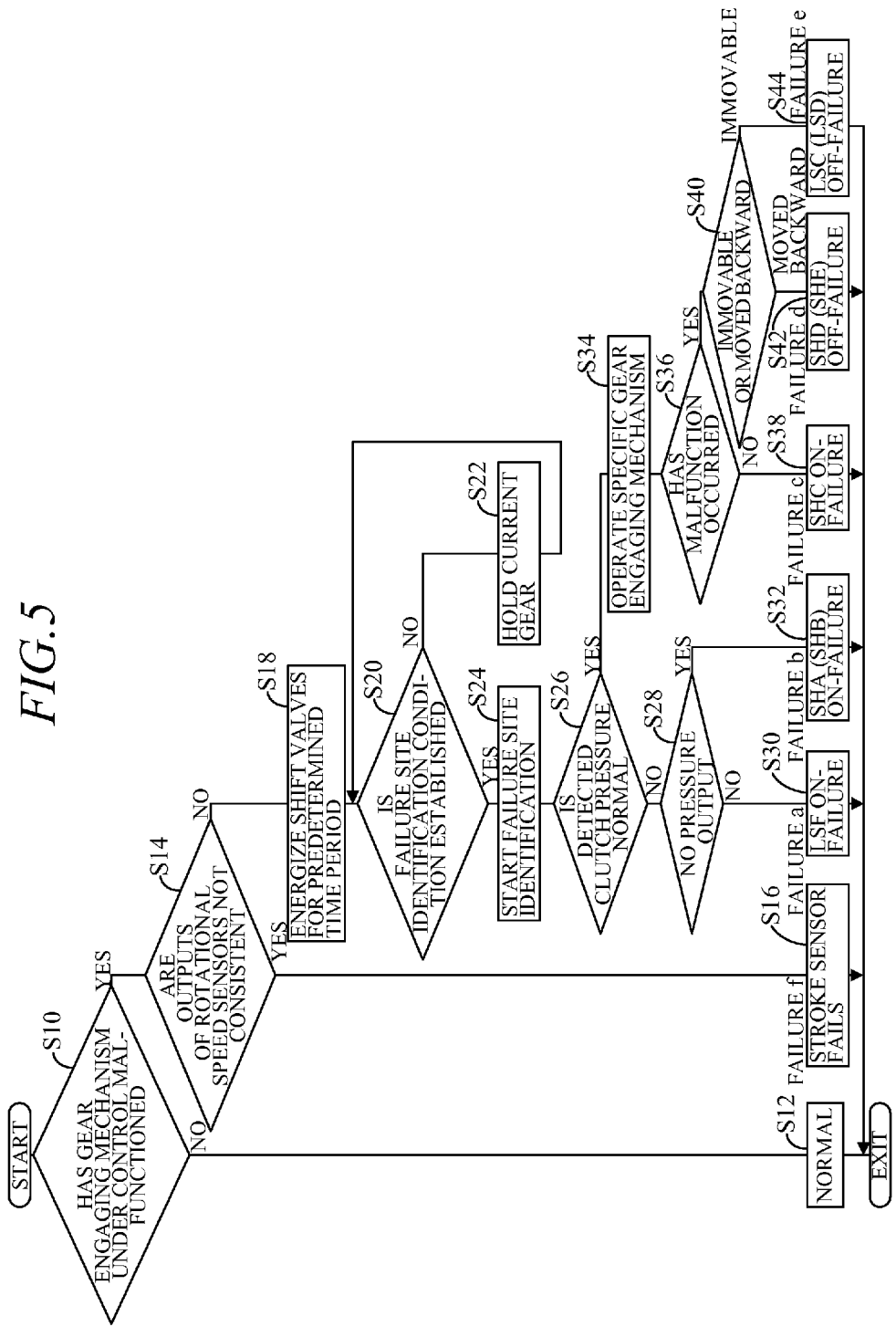
FIG. 5 is a flowchart showing the operation of the an automatic transmission failure determination apparatus according to an embodiment of this invention.
Figure 8:
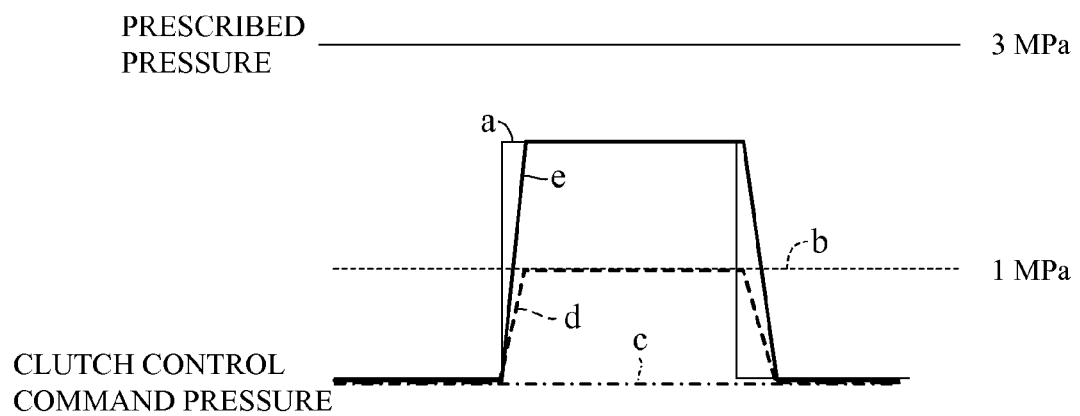
FIG. 8 is an explanatory diagram of line command pressures and the like outputted by the processing of the flowchart of FIG. 5.

FIG. 5 is a flowchart showing the operation; FIG. 6 is a diagram for explaining conceivable failure sites; FIG. 7 is a sequence diagram for explaining the processing of the flowchart of FIG. 5; FIG. 8 is an explanatory diagram of line command pressures and the like output by the processing of the flowchart of FIG. 5; and FIG. 9 is an explanatory diagram indicating which speed gear should be operated for identifying the failure site when a gear engaging mechanism 60 does not operate.

Now to explain, the program begins at S10, in which it is determined whether one of the gear engaging mechanisms 60 under control, e.g., the first-third speed gear engaging mechanism 60(1-3), has malfunctioned.

The first-third speed gear engaging mechanism 60(1-3) is a mechanism that engages (fixes) the first-speed drive gear 32 fixed on the first auxiliary input shaft 20 and meshed with the first-second speed driven gear 48 fixed on the output shaft 28, and the third-speed drive gear 34 also fixed on the first auxiliary input shaft 20 and meshed with the third-fourth speed driven gear 50 fixed on the output shaft 28, with the first auxiliary input shaft 20.

In S10, it is determined whether in this mechanism, in a situation where, for example, hydraulic pressure is supplied to the third speed piston chamber in order to move the piston rod (sleeve) from the central neutral positon to the in-gear position on the first speed side, the piston rod fails to move (gear engaging mechanism 60 failure).

This is determined from the output of the stroke sensor 102 installed near the first-third speed gear engaging mechanism 60(1-3) for detecting displacement of its sleeve (piston rod). When the result in S10 is NO, i.e., when it is determined that the piston rod (sleeve) has moved from the central neutral position to the in-gear position on the first speed side, the program proceeds to S12, in which it is determined that the operation of the first-third speed gear engaging mechanism 60(1-3) is normal.

Before continuing the explanation of the flowchart of FIG. 5, the failure determination processing of this embodiment will be summarized:

As shown in FIG. 6, conceivable failure sites that are made the subject of this processing are (1) ON-failure of the shift valve (SHA) 70*ma* (or the (SHB) 70*na*), (2) ON-failure of the shift valve (SHC) 70*oa*, (3) OFF-failure of the shift valve (SHD) 70*pa* (or the (SHE) 70*qa*), (4) OFF-failure of the linear solenoid valve (LSC) 70*h* (or the (LSD) 70*i*), (5) ON-failure of the linear solenoid valve (LSF) 70*k*, as well as wire-discontinuity-failure or shorting-failure of the solenoids of the foregoing, and (6) failure of the stroke sensor 102. "ON-failure" means stuck in the energized (operating) state and "OFF-failure" means stuck in the de-energized (inoperative) state.

The reason for including the parenthetical "or's" here is because of the difference, among the gear engaging mechanisms 60, between the set of valves related to the first-third speed gear engaging mechanism 60(1-3) and sixth-eighth speed gear engaging mechanism 60(6-8) on the right side in FIG. 2 and the set of valves related to the second-fourth speed gear engaging mechanism 60(2-4) and fifth-seventh speed gear engaging mechanism 60(5-7) on the left side of the figure.

Therefore, when the second-fourth speed gear engaging mechanism (60(2-4)) or the fifth-seventh speed gear engaging mechanism 60(5-7) on the right side is detected to have failed in S10, the conceivable failure site selected in FIG. 4 is (LSD) 70*i* instead of (LSC) 70*h* and (SHE) 70*qa* instead of (SHD) 70*pa*.

Returning to the explanation of FIG. 5, when the result in S10 is YES, the program proceeds to S14, in which it is determined whether the outputs of the second rotational speed sensor 84, which outputs a signal indicating rotational speed of the first auxiliary input shaft 20, and output of the fourth rotational speed sensor 90, which indicates rotational speed of the output shaft 28, are not consistent. This is shown in SEQ1 of the sequence diagram of FIG. 7.

More specifically, the reason for this is that in the case where the piston rod (sleeve) of the first-third speed gear engaging mechanism 60(1-3) moves from the central neutral position to the in-gear position on the first speed side, the output of the second rotational speed sensor 84 remains a value corresponding to the transmission input rotational speed NM, while in contrast the output of the fourth rotational speed sensor 90 becomes the rotational speed of the output shaft 28 and, owing to the difference of greater than a prescribed value arising between the two, is not consistent with the output of the stroke sensor 102.

Therefore, when the result in S14 is YES, the program proceeds to 516, in which failure of the stroke sensor 102 (more exactly, the stroke sensor 102 installed near the first-third speed gear engaging mechanism 60(1-3)) owing to malfunction or characteristic abnormality is finally determined or diagnosed (failure f).

When the result in S14 is NO, (6) stroke sensor 102 is diagnosed to be normal, and (6) stroke sensor 102 is removed from the failure sites.

The reason for determining that the stroke sensor 102 failed when not consistent in the comparison with the outputs of the rotational speed sensors 84, 90 is that their reliability is considered high at the point when the outputs of the two sensors 84, 90 on the rotational speed sensor side are used.

In the determination of S14, when determining whether piston rod (sleeve) of the gear engaging mechanism 60(2-4) or (6-8) has moved to the in-gear position on the even-numbered speed side, the outputs of the third rotational speed sensor 86 and fourth rotational speed sensor 90 are used.

When the result in S14 in the flowchart of FIG. 5 is NO, the program proceeds to S18, and in the ensuing processing from S20 to S44, when energizing signals (current control signals) are applied through the current supply circuit 74*a* (FIG. 3) to the solenoids of the shift valve (SHA) 70*ma* and so on indicated in FIG. 6, energization times longer by a predetermined period than usual (other than during failure determination) are determined. In other words, a time period for energizing electromagnetic solenoid valves of the valves 70*f*, 70*g*, 70*h*, 70*i* and valves 70*m*, 70*n*, 70*o*, 70*p*, 70*q* are prolonged.

More specifically, during identification or determination of a conceivable failure site, the pressure-regulating valves comprising of the line pressure-regulating valve 70*d* and linear solenoid valves 70*f*, 70*g*, 70*h*, 70*i*, 70*j*, 70*k*; the even-numbered speed/odd-numbered speed clutch shift valves 70*m*, 70*n*; and the select valves comprising of the first, second and third servo shift valves 70*o*, 70*p*, 70*q*, are operated by applying current to their electromagnetic valves (solenoids) for prolonged energization time periods, and in the processing of the ensuing S20 to S44, whether or not a return signal comes back from the CPU 74*c* of the current supply circuit 74*a* shown in FIG. 3 is determined, and when none does, it is finally determined or diagnosed that a wire-discontinuity/shorting failure occurred in the current supply circuit 74a with respect to the valve concerned. The prolonged energizing signal application time period is adopted as described above because with the ordinary relatively short energization time period, it sometimes becomes impossible to reliably detect presence/absence of a return signal.

The program next proceeds to S20, in which it is determined whether a failure site identification condition is established that allows identification processing of the conceivable failure sites (1) to (5) in FIG. 6. As the clutches 24, 26 are temporarily turned off (disengaged) during the identification processing, that the vehicle 1 is in stable driving condition, such as during cruising, is a required condition.

When the result in S20 is NO, the program proceeds to S22, in which the current gear is held, i.e., the currently established speed gear is held, while when the result is YES, the program proceeds to S24, in which failure site identification processing is started.

In the processing of S24, first, the application of current to the linear solenoid valves (LSA) 70h and (LSB) 70i is stopped (de-energized) to make the output hydraulic pressures zero and all clutches (clutches 24, 26) are turned off (disengaged), whereafter the clutch (first clutch 24 on odd-numbered speed side) by way of the same clutch shift valve (in this case the odd-numbered speed clutch shift valve 70ma) as that which supplies hydraulic pressure to the first-third speed gear engaging mechanism 60(1-3) determined to have malfunctioned is turned on (engaged) (as shown in SEQ 2, 3 in sequence diagram of FIG. 7).

At this time, the linear solenoid valve (LSF) 70k is current-controlled, so that, as shown in FIG. 8, the output hydraulic pressure of the line pressure-regulating valve 70d is increased to 3 MPa (prescribed pressure) while the linear solenoid valve (LSA) 70f is being current-controlled to raise the output hydraulic pressure to the clutch 24 (clutch control command pressure (indicated by symbol a)) to higher than 1 MPa (predetermined pressure (indicated by symbol b)), and the actual output hydraulic pressure at this time is detected by the hydraulic pressure sensor 94.

As pointed out earlier, the characteristic of the linear solenoid valve (LSF) 70k is defined differently from that of the other solenoid valves, namely, so that hydraulic pressure (via the line pressure-regulating valve 70d) is maximum at de-energization and falls upon application current, whereafter the output hydraulic pressure decreases with increasing energization current.

The program next proceeds to S26, in which it is determined whether the output hydraulic pressure (supplied pressure) to the clutch 24 detected by the hydraulic pressure sensor 94 is normal, specifically it is determined whether it is equal to or greater than 1 MPa (line pressure lower limit value (predetermined pressure b)), and when the result is NO, the program proceeds to S28, in which it is determined whether no pressure is outputted (output hydraulic pressure is zero).

When the result in S28 is NO, the program proceeds to S30, in which it is—finally determined or diagnosed that (5) linear solenoid valve (LSF) 70k sustained ON-failure, and when the result in S28 is YES, i.e., when the output hydraulic pressure is determined to be zero, the program proceeds to S32, in which it is finally determined or diagnosed that (1) shift valve (SHA) 70ma (or (SHB) 70na) sustained ON-failure.

The processing of FIG. 8 will be explained with reference to SEQ3 of the sequence diagram of FIG. 7.

In the case of "Clutch pressure not supplied (low pressure)" in the left column of SEQ3 (case indicated by symbol c to e in FIG. 8), since (1) shift valve (SHA) 70ma in the odd-numbered speed clutch shift valve 70m has incurred a failure on the ON (energized) side, the input port i1 is not connected to the output port o1, and as this suggests that hydraulic pressure to be supplied to the clutch 24 may be being drained, it is determined that (1) shift valve (SHA) 70ma (or (SHB) 70na) incurred ON-failure (failure b) (S32).

In the case of "Clutch pressure low (low line pressure)" in the middle column of SEQ3 (case indicated by symbol d in FIG. 8), specifically when (5) linear solenoid valve (LSF) 70k has incurred a failure on the ON (energized) side, it is determined that (5) linear solenoid valve (LSF) 70k incurred ON-failure (failure a) (S30).

In the case of "Normal pressure" in the right column of SEQ3 (case indicated by symbol e in FIG. 8), since (1) shift valve (SHA) 70ma and (5) linear solenoid valve (LSF) 70k can both be determined to be normal, they are removed from the failure sites.

Returning to the explanation of the flowchart of FIG. 5, when the result in S26 is YES, the program proceeds to S34, in which the mechanism 60 that includes the diagnostic speed gear to be selected in accordance with FIG. 9 for operation to identify the failure site when the first-third speed gear engaging mechanism 60(1-3) has malfunctioned, specifically the sixth-eighth speed gear engaging mechanism (6-8), is operated and processing performed. The processing from S34 onward is that of SEQ4 and 5 in the sequence diagram of FIG. 7.

As shown in FIG. 2, the four gear engaging mechanisms (60) are equipped with hydraulic pressure cylinders each capable of selectively establishing one or the other of two speed gears among the eight speed gears by moving a piston rod when hydraulic pressure is supplied, and comprise the first servo shift valve 70o, second servo shift valve 70p and third servo shift valve 70q each equipped with one among the shift valve 70oa, 70pa and 70qa that shift between the ON (operating condition) and OFF (inoperative condition) in response to solenoid energization/de-energization, wherein a configuration is adopted that deploys the second servo shift valve 70p downstream of the first servo shift valve 70o and enables supply of hydraulic pressure to opposite end sides of pistons of hydraulic pressure cylinders of the 1-3 speed (first) and 6-8 speed (second) gear engaging mechanisms (60(1-3) and 60(6-8)) among the four gear engaging mechanisms 60.

Moreover, a configuration is adopted wherein the third servo shift valve 70q is disposed downstream of the first servo shift valve 70o, hydraulic pressure can be supplied to opposite end sides of pistons of hydraulic pressure cylinders of the 2-4 speed (third) and 5-7 speed (fourth) gear engaging mechanisms (60(2-4) and 60(5-7)) among the four gear engaging mechanisms 60, and enables first to eighth speed gears established through the four gear engaging mechanisms (60) to be specified in four patterns defined by combining operating states and inoperative states of arbitrary sets of at least two (70o and 70q or 70o and 70q) among the first, second and third select valves (70o, 70p, 70q).

Specifically, in the program configuration according to the flowchart of FIG. 5, in the case when one of the four gear engaging mechanisms that sustained the malfunction (60(1-3)) is identified using one of four patterns of arbitrary sets (e.g., two sets composed by the first and second servo shift valves 70o), a different mechanism (60(6-8)) among the mechanisms identified by one of the remaining three patterns of the same two sets is selected and failure is determined or diagnosed by establishing a speed gear with that mechanism.

Still more specifically, a configuration is adopted whereby the displacement of the piston of the hydraulic pressure cylinder of the first and second engaging mechanisms (60 (1-3), 60(6-8)) (or third and fourth engaging mechanisms (60(2-4), 60(5-7))) is detected by the stroke sensor 102, and which among the two linear solenoid valves (LSC) 70h, (LSD) 70i and the servo shift valves 70o, 70p, 70q failed is determined based on the detection results.

The reason for this is that, when, for example, one gear engaging mechanism (first-third speed gear engaging mechanism 60(1-3)) sustained a malfunction, it is necessary for identifying the failure site to supply hydraulic pressure to and detect the operating state of the mechanism (sixth-eighth speed gear engaging mechanism 60(6-8)) identified by the valves 70o, 70p constituting the same hydraulic pressure supply route.

In other words, the reason is that in order to pinpoint a failure site, when establishing a speed gear by the mechanism concerned, it is necessary for it to be an adjacent speed gear of the mechanism whose operating condition/inoperative condition is not the same as the shift valve 70pa (or 70qa) in the servo shift valve 70p (or 70q) of the speed gear of the mechanism determined to have malfunctioned, specifically, a combination is required whose operating condition/inoperative condition is exactly opposite from the servo shift valves 70o and 70p, or 70o and 70q, e.g., if first speed, then eighth speed, if third speed, then sixth speed, if second speed, then seventh speed, and if fifth speed, then fourth speed. FIG. 9 shows these identifying speed gears (more exactly, piston chambers).

The explanation of the flowchart of FIG. 5 will now be resumed against the backdrop of the foregoing.

Following the processing of S34, the program proceeds to S36, in which it is determined whether a malfunction occurred in the sixth-eighth speed gear engaging mechanism 60(6-8), and when the result is NO, the program proceeds to S38, in which it is finally determined or diagnosed that (2) shift valve (SHC) 70oa sustained ON-failure (failure c).

On the other hand, when the result in S36 is YES, the program proceeds to S40, in which it is determined from the output of the stroke sensor 102 in the sixth-eighth speed gear engaging mechanism 60(6-8) whether the piston rod is immovable (has not moved) or moved backward (owing to pressure that should have been supplied to the eighth-speed piston chamber being supplied to the opposite-direction sixth piston chamber).

When backward movement is determined in S40, the program proceeds to S42, in which it is finally determined or diagnosed that (3) shift valve (SHD) 70pa (or (SHE) 70qa) sustained OFF-failure (failure d), while when immobility is determined, the program proceeds to S44, in which it is finally determined or diagnosed that (4) linear solenoid valve (LSC) 70h (or (LSD) 70i) sustained OFF-failure (failure e). The foregoing is shown in SEQ5 of the sequence diagram of FIG. 7. The processing shown in SEQ5 (processing of S34) is preceded by a preshift back to neutral in SEQ4.

To amplify on the foregoing explanation with reference to FIG. 7, as shown in the left column of SEQ5, the fact that eighth speed was not engaged (not established) and immobility was determined suggests that the output of (4) linear solenoid valve (LSC) 70h is insufficient (no control source pressure output), from which it is determined that (4) linear solenoid valve (LSC) 70h sustained OFF-failure (or Low-pressure-failure). In line with this, (2) shift valve (SHC) 70oa, (3) shift valve (SHD) 70pa, and (6) stroke sensor 102 are diagnosed to be normal.

Further, as shown in the middle column of SEQ5, when the piston rod is determined to have moved backward (entered the sixth-speed piston chamber on the opposite side), it is determined that (3) shift valve (SHD) 70pa sustained OFF-failure (de-energization side failure; failure d), namely, the cause is diagnosed to be that in the second servo shift valve 70p the input port i1 was connected to the output port o2 on the right side.

Moreover, as shown in the right column of SEQ5, when normal supply to the eight-speed piston chamber is determined (sixth-speed established), it is determined that (2) shift valve (SHC) 70oa sustained ON-failure (energization side failure) and hydraulic pressure is being supplied to another path of the supply destination route, i.e., that in the first servo shift valve 70o, the input port i1 which should have been connected to the output port o4 on the right side was incorrectly connected to the output port o3 on the left side (failure c). As a result, (1) shift valve (SHA) 70ma, (3) shift valve (SHD) 70pa, and (4) linear solenoid valve (LSC) 70h are diagnosed to be normal.

Thus a configuration is adopted whereby, in the processing of S10 to S32, when it is attempted to establish one of the first-speed to eighth-speed gears by supplying hydraulic pressure to one of the four gear engaging mechanisms 60 through the odd-numbered/even-numbered speed clutch shift valve (70m, 70n) and one of the multiple select valves (first, second and third servo shift valves 70o, 70p and 70q), if one of the four gear engaging mechanisms 60 is detected to be inoperative by a stroke sensor 102 (or rotational speed sensor 84 (86) or 90) (S10), the output of the hydraulic pressure sensor 94, 96 is first used to determine whether the output pressure of a line pressure-regulating valve among the line pressure-regulating valves (line pressure-regulating valve 70d and linear solenoid valve 70k) and the multiple pressure-regulating valves disposed downstream thereof (linear solenoid valves 70f, 70g, 70h, 70i) is equal to or greater than a predetermined pressure, and when it is found by this that the output hydraulic pressure of the line pressure-regulating valve is not equal to or greater than the predetermined pressure (b in FIG. 8), the line pressure-regulating valve is determined or diagnosed to have failed, while when the output hydraulic pressure of the line pressure-regulating valve is found to be equal to or greater than the predetermined pressure, which of the multiple pressure-regulating valves (70f, 70g, 70h, 70i) and multiple select valves (70m, 70n, 70o, 70p, 70q) failed is determined or diagnosed in the processing of S34 to S44 by using the stroke sensor 102 to detect the operating state of a different mechanism among the four multiple gear engaging mechanisms 60 from the aforesaid one mechanism while supplying the mechanism with hydraulic pressure through one of the multiple select valves (S34 to S44).

More specifically, a configuration is adopted whereby pressure-regulating valve failure determination is implemented by raising the output hydraulic pressure of the second pressure-regulating valve (70f, 70g) to higher than a predetermine pressure while raising the output hydraulic pressure of the line pressure-regulating valve (70d, 70k) to a prescribed pressure, determining on the one hand that the line pressure-regulating valve (70d, 70k) failed when the output hydraulic pressure of the second pressure-regulating valve does not rise to the predetermined pressure during the determination (S10 to S32), and determining on the other hand that one among the first pressure-regulating valve (70h, 70*i*), second pressure-regulating valve (70*f*, 70*g*) and multiple select valves (70*m*, 70*n*, 70*o*, 70*p*, 70*q*) failed when the output hydraulic pressure of the second pressure-regulating valve rises to the predetermined pressure (S34 to S44).

As mentioned above, the embodiment is configured to have an apparatus for determining failure of an automatic transmission (T), comprising: input shafts (14, 16, 20, 22) that input rotation of a prime mover (engine 10) mounted on a vehicle (1) through a pair of clutches (24, 26); an output shaft (28) arranged in parallel to the input shafts; gear engaging mechanisms (60) that engage one of gears (32, ... 54) to the input shafts and the output shaft to establish one of speeds corresponding to the engaged one of the gears; a line pressure-regulating valve (70*d*, 70*k*) that pressure-regulates hydraulic pressure discharged from an oil pump (70*c*) to line pressure; pressure-regulating valves (70*f*, 70*g*, 70*h*, 70*i*) that pressure-regulate the line pressure regulated by the line pressure-regulating valve (70*d*, 70*k*); select valves (70*m*, 70*n*, 70*o*, 70*p*, 70*q*) that selectively supply pressure regulated by the pressure regulating valves (70*f*, 70*g*, 70*h*, 70*i*) to one of the clutches (24, 26) and one of the gear engaging mechanisms (60); an operating state detector (102, 82, 84, 86) that detects operating state of the gear engaging mechanisms (60); a pressure detector (94, 96) that detect the pressure regulated by the line pressure-regulating valve (70*d*, 70*k*) and the pressure-regulating valves (70*f*, 70*g*, 70*h*, 70*i*); and a failure determiner (74) that determines whether the pressure regulated by the line pressure-regulating valve (70*d*, 70*k*) is equal to or greater than a predetermined pressure based on an output of the pressure detector when one of the gear engaging mechanisms (60) is supplied with the pressure so as to establish a speed, but is detected to be inoperative by the operating state detector, and determines that the line pressure-regulating valve (70*d*, 70*k*) has failed, if the pressure regulated by the line pressure-regulating valve (70*d*, 70*k*) is determined to be less than the predetermined pressure (S10-S30), whereas determines one from among the pressure-regulating valves (70*f*, 70*g*, 70*h*, 70*i*) and select valves (70*m*, 70*n*, 70*o*, 70*p*, 70*q*) has failed by supplying the pressure to other of the gear engaging mechanisms (60) and by detecting the operating state of the other gear engaging mechanism (60), if the pressure regulated by the line pressure-regulating valve (70*d*, 70*k*) is determined to be equal to or greater than the predetermined pressure (S32-S44), thereby determining which among the multiple pressure-regulating valves (70*f*, 70*g*, 70*h*, 70*i*) and multiple select valves (70*m*, 70*n*, 70*o*, 70*p*, 70*q*) failed, when operation of one of gear engaging mechanism 60 is inoperative, the source of the failure can be identified promptly and efficiently.

In the apparatus, the pressure-regulating valves (70*f*, 70*g*, 70*h*, 70*i*) comprise first group of pressure-regulating valves (70*h*, 70*i*) that pressure-regulate the line pressure regulated by the line pressure-regulating valve (70*d*, 70*k*) and supply it to the gear engaging mechanisms (60) through the select valves (70*m*, 70*n*, 70*o*, 70*p*, 70*q*) and a second group of pressure-regulating valves (70*f*, 70*g*) that pressure-regulate the line pressure regulated by the line pressure-regulating valve (70*d*, 70*k*) and supply it to the clutches (24, 26) through some of the select valves (70*m*, 70*n*); and the failure determiner (74) conducts pressure-regulating valve failure determination by raising output pressure of the second group of the pressure-regulating valves (70*f*, 70*g*) over the predetermined pressure, while raising output pressure of the line pressure-regulating valve (70*d*, 70*k*) to a prescribed pressure, and determines that the line pressure-regulating valve (70*d*, 70*k*) has failed if the output pressure of the second group of pressure-regulating valves (70*f*, 70*g*) is determined not to have reached the predetermined pressure (S10-S30), whereas determines one from among the first group and second group of the pressure-regulating valves (70*f*, 70*g*, 70*h*, 70*i*) and select valves (70*m*, 70*n*, 70*o*, 70*p*, 70*q*) has failed if the output pressure of the second group of pressure-regulating valves (70*f*, 70*g*) is determined to have reached the predetermined pressure (S32-S44), whereby the source of the failure can be identified promptly and efficiently because the presence/absence of failure of the common source of hydraulic pressure supplied to both the clutches 24, 26 and the gear engaging mechanisms 60 is determined first.

In the apparatus, the gear engaging mechanisms (60) comprises a first mechanism (60(1-3)), a second mechanism (60(6-8)), a third mechanism (60(2-4)) and a fourth mechanism (60(5-7)) each provided with two opposed piston chambers that selectively establish one or other of two speeds; the select valves include a first select valve (70*o*) having an electromagnetic solenoid valve (70*oa*) that displaces between operating position and inoperative position in response to solenoid energization/de-energization, a second select valve (70*p*) disposed downstream of the first select valve in hydraulic pressure supply and having an electromagnetic solenoid valve (70*pa*) that displaces between operating position and inoperative position in response to solenoid energization/de-energization, and a third select valve (70*q*) disposed downstream of the first select valve in hydraulic pressure supply and having an electromagnetic solenoid valve (70*qa*) that displaces between operating position and inoperative position in response to solenoid energization/de-energization; the second select valve (70*p*) is connected to the two opposed piston chambers of the first and second gear engaging mechanisms (e.g., 60(1-3), 60(6-8)), and the third select valve (70*q*) is connected to the two opposed piston chambers of the third and fourth engaging mechanisms (e.g., 60(2-4), 60(5-7)), such that first to eighth speed gears established through the first to fourth gear engaging mechanisms (60) are identified in four patterns defined by combining operating state and non-operating state of at least two of the first to third select valves (70*o*, 70*p*, 70*q*); and the failure determiner (74) conducts pressure-regulating valve failure determination, when one (e.g., 60(1-3) or 60(2-4)) of the first to fourth gear engaging mechanisms (60) that sustains malfunction is identified by one of the four patterns, by selecting other (e.g., 60(6-8) or 60(5-7)) of the first to fourth gear engaging mechanisms (60) identified by one of other three of four patterns and by supplying hydraulic pressure to the piston chambers of the other mechanism (60), whereby, in addition to the aforesaid effects, the source of the failure can be identified promptly and efficiently.

In the apparatus, the failure determiner (74) conducts the pressure-regulating valve failure determination by supplying hydraulic pressure to the piston chambers of the other (e.g., 60(6-8) or 60(5-7) of the first to fourth gear engaging mechanisms (60) and by detecting displacement of a piston in the chamber by the operating state detector, and determines that one from among the first group and second group of the pressure-regulating valves (70*f*, 70*g*, 70*h*, 70*i*) and select valves (70*m*, 70*n*, 70*o*, 70*p*, 70*q*) has failed based on detection result of the operating state detector (S32-S44), whereby, in addition to the aforesaid effects, it becomes possible to identify the source of the failure still more promptly and efficiently.

In the apparatus, the failure determiner (74) prolongs a time period for energizing electromagnetic solenoid valves of the pressure-regulating valves (70*f*, 70*g*, 70*h*, 70*i*) and select valves (70*m*, 70*n*, 70*o*, 70*p*, 70*q*), when determining whether the one from among the pressure-regulating valves (70*f*, 70*g*, 70*h*, 70*i*) and select valves (70*m*, 70*n*, 70*o*, 70*p*, 70*q*) has failed. With this, in addition to the aforesaid effects, it becomes possible to detect whether a return signal is present and identify the source of the failure still more promptly and efficiently.

In the apparatus, the automatic transmission comprises a double-clutch automatic transmission having the input shafts (14, 16, 20, 22) that input rotation of the prime mover (10) through the first and second clutches (24, 26), the output shaft (28) arranged in parallel to the input shafts, and the gear engaging mechanisms (60) in m number that engage one of gears (32-54) to the input shafts and the output shaft to establish one of speeds corresponding to the engaged one of the gears from among n (n: 2m) number of speeds. With this, in addition to the aforesaid effects, it becomes possible to identify the source of the failure still more promptly and efficiently in the double-clutch automatic transmission.

In the above, the double-clutch transmission in the foregoing is not limited to the illustrated structure and any structure is acceptable insofar as it is equipped with the aforesaid gear engaging mechanism.

While the invention has thus been shown and described with reference to specific embodiment, it should be noted that the invention is in no way limited to the details of the described arrangement; changes and modifications may be made without departing from the scope of the appended claims.

What is claimed is:

1. An apparatus for determining failure of an automatic transmission, comprising:
   input shafts that input rotation of a prime mover through a pair of clutches, the prime mover being mounted on a vehicle;
   an output shaft arranged in parallel to the input shafts;
   gears provided between the input shafts and the output shaft;
   gear engaging mechanisms that engage one of the gears to the input shafts and the output shaft to establish one of speeds corresponding to the engaged one of the gears;
   a line pressure-regulating valve that pressure-regulates hydraulic pressure discharged from an oil pump to a line pressure;
   pressure-regulating valves that pressure-regulate the line pressure regulated by the line pressure-regulating valve;
   select valves that selectively supply pressure regulated by the pressure-regulating valves to one of the pair of clutches and one of the gear engaging mechanisms;
   an operating state detector that detects an operating state of the gear engaging mechanisms;
   a pressure detector that detects the pressure regulated by the line pressure-regulating valve and the pressure-regulating valves; and
   a failure determiner that determines whether the pressure regulated by the line pressure-regulating valve is equal to or greater than a predetermined pressure based on an output of the pressure detector when one of the gear engaging mechanisms is supplied with the pressure so as to establish a speed, but the one of the gear engaging mechanisms is detected to be inoperative by the operating state detector, and
   the failure determiner determines that the line pressure-regulating valve has failed if the pressure regulated by the line pressure-regulating valve is determined to be less than the predetermined pressure, whereas the failure determiner determines one from among the pressure-regulating valves and select valves has failed by supplying the pressure to other of the gear engaging mechanisms and by detecting the operating state of the other gear engaging mechanism if the pressure regulated by the line pressure-regulating valve is determined to be equal to or greater than the predetermined pressure.

2. The apparatus according to claim 1, wherein the pressure-regulating valves comprise a first group of pressure-regulating valves that pressure-regulate the line pressure regulated by the line pressure-regulating valve and supply it to the gear engaging mechanisms through the select valves and a second group of pressure-regulating valves that pressure-regulate the line pressure regulated by the line pressure-regulating valve and supply it to the pair of clutches through some of the select valves separate from the first group of pressure-regulating valves; and
   the failure determiner conducts pressure-regulating valve failure determination by raising an output pressure of the second group of the pressure-regulating valves over the predetermined pressure, while raising output pressure of the line pressure-regulating valve to a prescribed pressure, and determines that the line pressure-regulating valve has failed if the output pressure of the second group of pressure-regulating valves is determined not to have reached the predetermined pressure, whereas determines one from among the first group and second group of the pressure-regulating valves and select valves has failed if the output pressure of the second group of pressure-regulating valves is determined to have reached the predetermined pressure.

3. The apparatus according to claim 1, wherein the gear engaging mechanisms comprises a first mechanism, a second mechanism, a third mechanism and a fourth mechanism each provided with two opposed piston chambers that selectively establish one or other of two speeds;
   the select valves include a first select valve having a first electromagnetic solenoid valve that displaces between a first operating position and a first inoperative position in response to a first solenoid energization/de-energization, a second select valve having a second electromagnetic solenoid valve that displaces between a second operating position and a second inoperative position in response to a second solenoid energization/de-energization, and a third select valve having a third electromagnetic solenoid valve that displaces between a third operating position and a third inoperative position in response to a third solenoid energization/de-energization, and the second select valve and the third select valve are disposed between the first select valve and the gear engaging mechanisms in a hydraulic pressure supply line to the gear engaging mechanisms;
   the second select valve is connected to the two opposed piston chambers of the first and second gear engaging mechanisms, and the third select valve is connected to the two opposed piston chambers of the third and fourth engaging mechanisms, such that first to eighth speed gears established through the first to fourth gear engaging mechanisms are identified in four patterns defined by combining operating state and non-operating state of at least two of the first to third select valves;
   and
   the failure determiner conducts pressure-regulating valve failure determination, when one of the first to fourth gear engaging mechanisms that sustains a malfunction is identified by one of the four patterns, by selecting other of the first to fourth gear engaging mechanisms identified by one of other three of four patterns and by supplying hydraulic pressure to the piston chambers of the other of the first to fourth gear engaging mechanisms.

4. The apparatus according to claim 3, wherein the failure determiner conducts the pressure-regulating valve failure determination by detecting displacement of a piston in the chamber by the operating state detector in addition to supplying the hydraulic pressure to the piston chambers of the other of the first to fourth gear engaging mechanisms, and determines that one from among the first group and the second group of the pressure-regulating valves and select valves has failed based on a detection result of the operating state detector.

5. The apparatus according to claim 1, wherein the failure determiner prolongs a time period for energizing electromagnetic solenoid valves of the pressure-regulating valves and select valves, when determining whether the one from among the pressure-regulating valves and select valves has failed.

6. The apparatus according to claim 1, wherein the pair of clutches are a first clutch and a second clutch,
   the input shaft includes a first input shaft that inputs rotation of the prime mover through the first clutch and a second input shaft that inputs rotation of the prime mover through the second clutch,
   the gears include odd-numbered gears for odd-numbered speeds and even-numbered gears for even-numbered speeds, and
   the gear engaging mechanisms include gear engaging mechanisms for odd-numbered speeds that engage one of the odd-numbered gears to the first input shaft and the output shaft and gear engaging mechanisms for even-numbered speeds that engage one of the even-numbered gears to the second input shaft and the output shaft.

* * * * *